United States Patent [19]

White, Jr.

[11] 4,380,198

[45] Apr. 19, 1983

[54] VEHICLE HAVING IMPROVED COUPLING SYSTEM AND SYSTEM FOR ABSORPTION OF SHOCK ON COUPLING

[75] Inventor: Eugene B. White, Jr., Park Forest, Ill.

[73] Assignee: White Machinery Corporation, Joliet, Ill.

[21] Appl. No.: 183,053

[22] Filed: Sep. 2, 1980

Related U.S. Application Data

[63] Continuation-in-part of Ser. No. 40,855, May 21, 1979, Pat. No. 4,355,584.

[51] Int. Cl.³ .............................................. B60F 1/04
[52] U.S. Cl. ................................ 105/26 R; 105/26.1; 105/215 C
[58] Field of Search .................. 105/26 R, 26.1, 90 A, 105/73, 75, 177, 215 C; 213/7, 13, 14, 15, 75 R

[56] References Cited

U.S. PATENT DOCUMENTS

| | | | |
|---|---|---|---|
| 2,718,195 | 9/1955 | Bock et al. | 105/75 X |
| 3,198,137 | 8/1965 | White, Jr. | 105/26 R |
| 3,232,241 | 2/1966 | White, Jr. | 105/75 |
| 3,420,191 | 1/1969 | White, Jr. | 105/26 R X |
| 3,540,381 | 11/1970 | White, Jr. | 105/75 |
| 3,633,514 | 1/1972 | Deike | 105/26 R |
| 3,884,156 | 5/1975 | Ames et al. | 105/75 |
| 3,892,187 | 7/1975 | White, Jr. | 105/75 |
| 4,067,259 | 1/1978 | Ames et al. | 105/26 R |
| 4,111,273 | 9/1978 | Blackburn | 180/14 R |
| 4,167,142 | 9/1979 | Ames | 105/26 R |
| 4,355,584 | 10/1982 | White, Jr. | 105/215 C |

FOREIGN PATENT DOCUMENTS 2050969 1/1981 United Kingdom ............ 105/215 C

*Primary Examiner*—Joseph F. Peters, Jr.
*Assistant Examiner*—Mitchell J. Hill
*Attorney, Agent, or Firm*—Charles F. Pigott, Jr.

[57] ABSTRACT

A self-propelled vehicle for moving railroad cars and the like. The vehicle may have weight transfer means for increasing its traction by taking weight from a railroad car to one that is coupled. The vehicle defines a first chassis having wheels carried thereby. In accordance with this invention, a second chassis is carried by the first chassis, with the second chassis carrying means for coupling the vehicle to a railroad car or the like, the second chassis being vertically movable relative to the first chassis. Lift cylinders may be positioned between the first and second chassis to control the vertical position of the second chassis for improved coupling characteristics. Also, the second chassis may be horizontally movable along the longitudinal axis of the vehicle, with resilient stop means being present for limiting the horizontal motion of the second chassis in a shock-reducing manner. Accordingly, shock encountered by the transmission means of the vehicle, while coupling with railroad cars and the like, is reduced.

12 Claims, 3 Drawing Figures

U.S. Patent  Apr. 19, 1983  4,380,198
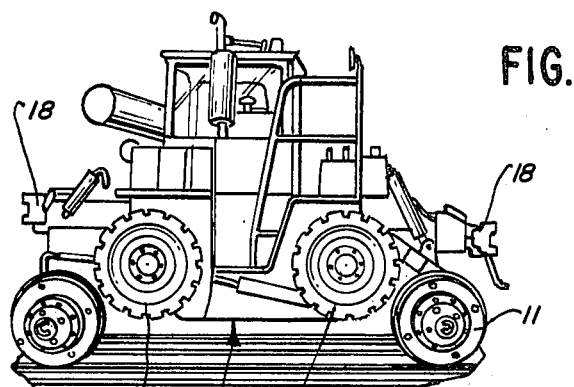
FIG. 1
FIG. 2
FIG. 3
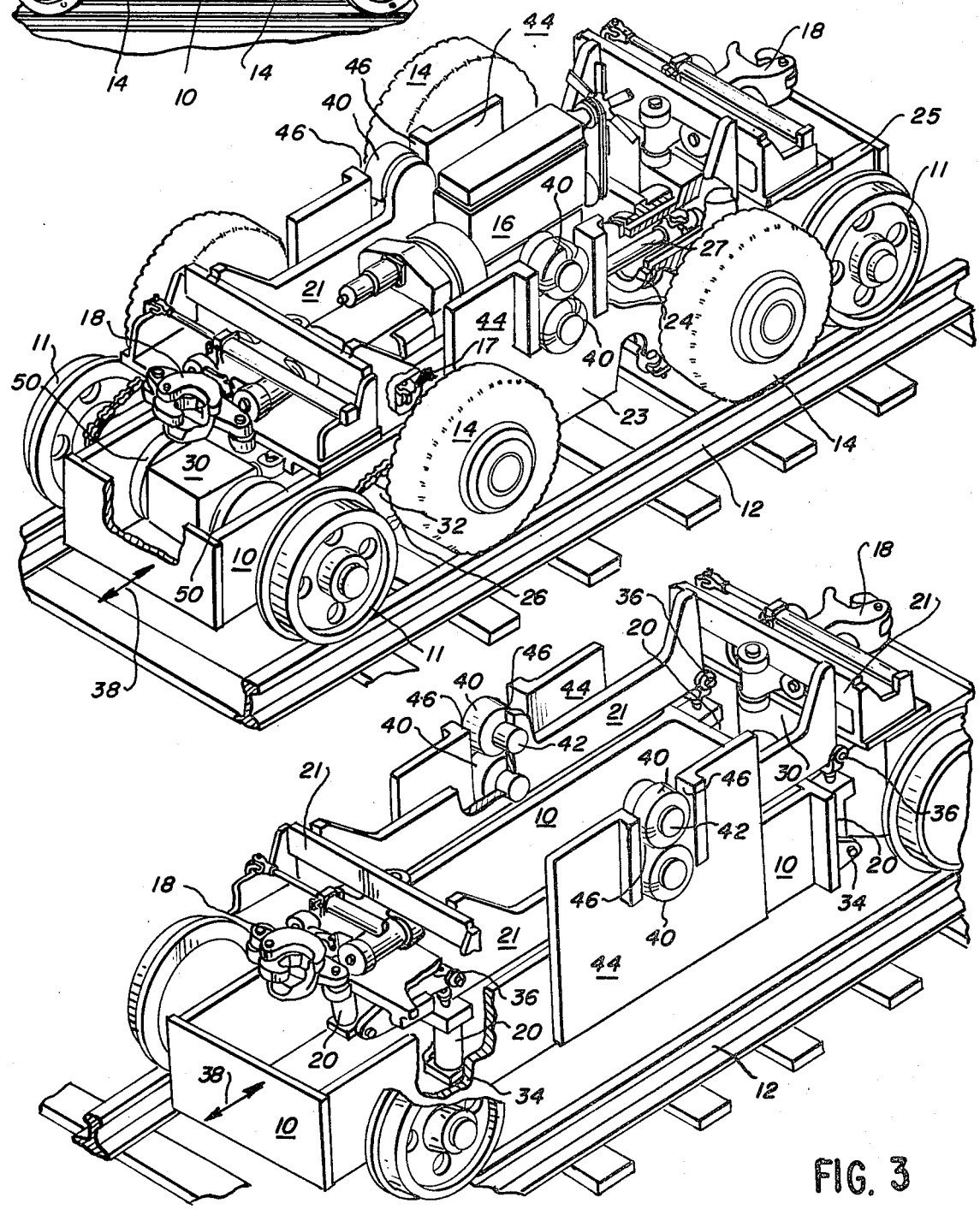

VEHICLE HAVING IMPROVED COUPLING SYSTEM AND SYSTEM FOR ABSORPTION OF SHOCK ON COUPLING

CROSS-REFERENCE TO RELATED APPLICATION

This application is a continuation-in-part of U.S. Ser. No. 040,855, filed May 21, 1979, now U.S. Pat. No. 4,355,584 issued Oct. 26, 1982.

BACKGROUND OF THE INVENTION

In-plant railcar moving vehicles are utilized in many industrial operations to move a railroad car a few hundred yards or so from one location to another nearby location for loading or unloading. The use of such vehicles, which are relatively small, avoids the need for an available locomotive to move the railroad cars. As a further advantage of some railcar moving vehicles which are in present commercial use, they possess both railroad wheels and road wheels so they can operate both on and off of railroad tracks, with one of the sets of wheels being retractable so that they are used in alternative manner.

Also, these railcar moving vehicles may have a weight transfer capability in which the coupler mechanism is adapted to lift upwardly, to take weight from the railroad car to which it is coupled to increase the traction of the relatively small railcar moving vehicle on the track while moving a heavily loaded railroad car.

Railcar moving vehicles of the type described above are commercially available from the White Machinery Corporation of Joliet, Illinois.

In accordance with this invention, improvements are provided in the above described railcar moving vehicles, as well as other types of vehicles for coupling to and moving heavy cars and vehicles of any type, including wagons, barges and airplanes on the ground as well as railroad cars specifically contemplated herein. By this invention, self-propelled vehicles for moving loaded railroad cars and the like may exhibit an improved coupling mechanism so that the couplers of the vehicle of this invention may be placed more in line with the coupler of a railcar or the like for better connection, while at the same time providing improved weight transfer capability when desired, which can derive from the straighter connection between the couplers of the vehicle of this invention and the railroad car while the weight transfer process is taking place. The vehicle of this invention is made more versatile by the vertical adjustment capability of the coupler, with or without the use of a weight transfer capability, to couple with couplers of varying height.

Additionally, the invention of this application provides a shock absorption means to protect the operator and the vehicle of this invention, and particularly the transmission and motor, from the shock which can be encountered upon coupling to a railroad car in normal usage and also in the event where the operator accidentally approaches the railroad car at an excessive speed.

DESCRIPTION OF THE INVENTION

In accordance with this invention, a self-propelled vehicle is provided for moving loaded cars and the like. The vehicle defines a first chassis, with wheels carried thereby.

A second chassis is carried by the first chassis, with the second chassis carrying means for coupling the vehicle to a car or the like, and specifically a railroad car. The second chassis is vertically movable relative to the first chassis. Lift cylinder means may be positioned between the first chassis and the second chassis, to control the vertical position of the second chassis.

As stated above, the invention of this application finds particular utility in conjunction with a self-propelled vehicle having weight transfer means for increasing its traction by taking weight from a railroad car to which it is coupled, with various mechanical systems utilizing such weight transfer means being well known to the art.

Specifically, weight transfer systems are shown by U.S. Pat. Nos. 2,718,195; 3,420,191; 3,540,381; 3,232,241; and 3,892,187.

Generally, the first chassis carries motor and transmission means for driving the vehicle wheels.

The second chassis may be horizontally movable along the longitudinal axis of the vehicle. Resilient stop means may be provided for limiting the horizontal motion of the second chassis in a shock-reducing manner, whereby shock encountered by the transmission means of the vehicle, while coupling with railroad cars and the like, is reduced.

The previously mentioned lift cylinders are preferably pivotally mounted on the first chassis and second chassis to permit the horizontal motion described above. One of the first and second chassis may carry resilient buffer means, the buffer means being contained within and horizontally movable between opposed spaced walls of aperture means defined by the other of the first and second chassis, to provide the above described resilient stop means for limiting the horizontal motion. The above is intended to include the situation in which the resilient buffer means fits in the aperture means in control with both opposed, spaced walls but, because of the resilient characteristic of the buffer means, the great bulk of the material of the buffer means is capable of moving horizontally a short distance back and forth to absorb shock.

The second chassis may be of a generally rectangular structure, defining a central aperture in which the motor carried by the first chassis, is positioned.

Referring to the drawings, FIG. 1 is an elevational view of a railcar moving vehicle of this invention.

FIG. 2 is a perspective view of the railcar moving vehicle of FIG. 1, with outer portions removed to show the improvement of this invention.

FIG. 3 is a perspective view in accordance with FIG. 2, with further portions of the vehicle removed and broken away to further show the improvements of this invention.

Referring to the drawings, a traction vehicle mounted on first chassis 10 is shown, having fixed rail wheels 11, shown to be resting on rails 12, and retractable road wheels 14. First chassis or frame 10 carries a conventional motor 16, portions such as the radiator for a cooling system being removed for clarity. Portions of a conventional transmission 17 are also shown.

Front and rear couplers 18, and front and rear pairs of lift cylinders 20 are provided. Lift cylinders 20 are pivotally mounted between first chassis 10 and a generally rectangular second chassis 21 positioned on first chassis 10. Second chassis 21 defines a central aperture in which motor 16 is positioned.

First chassis 10 is divided and connected by horizontal pivot 24 into a front portion 23 and a rear portion 25 so that portions 23, 25 of the first chassis can rotate about the longitudinal axis 38 of the vehicle with respect to each other. Front frame or portion 23 carries the front rail wheels 11, while rear frame 25 carries the rear rail wheels 11.

Cylindrical pivot 24 is shown to be a hollow structure, through which drive shaft 27 of the transmission 17 can pass into operative contact with the rear rail wheels 11. Pivot 24 is positioned in generally coaxial relationship with drive shaft 27 for improved simplicity of construction and function.

The effect of this system is that the relative oscillation of frame portion 23, 25 permits equal loading and firm placement of the four rail wheels 11 on rail 12 despite any irregularities in the track. This is particularly valuable when the vehicle of this invention is operating under, for example, a 40,000 pound or more weight transfer load, and assists in the avoidance of derailment.

Chain drive 26 is shown in FIG. 2, by which each of the front road wheels 14 are connected to front rail wheels 11 by the use of sprockets in a manner similar to that shown in the previously cited patent application.

Internal planetary-type differential axles 30 may be provided to each of the front and rear pairs of rail wheels 11 to provide power to them from motor 16, as well as providing power to the front road wheels 14 through the chain drive 26.

Preferably, differential axle 30 includes a locking differential system in which power is automatically imparted to a non-slipping wheel in the event the other wheel is slipping. Such a system is commercially available in conjunction with the internal planetary-type differential axle 30 used herein.

Brakes 50 are shown positioned adjacent differential axle 30 and spaced centrally inwardly of first chassis 10, preferably by a distance which is sufficient to avoid damage to the brakes 50 upon derailment. Typically, encased, wet-type disc brakes running in oil may be used for the braking means 50, avoiding any outside atmospheric contamination.

A suitable axle assembly which may be utilized for the differential axle means including differential 30 used herein is a John Deere AM 52 axle assembly including an internal planetary final drive, spiral bevelled pinion and gears and the hydraulic wet disc brakes as described.

Transmission 17 connects motor 16 through universal joints to the respective differential axle means 30 connected to the front and rear rail wheels 11.

Each retractable front and rear roadwheel 14 is carried by a rotatable lever arm 32 which is pivotable about the center of rotation of the axle of the rail wheels 11, as shown in detail in the previous application, to permit the lifting of roadwheel 14 off of the ground to the retracted or raised position, and correspondingly to lower roadwheel 14 again as desired. FIG. 2 shows roadwheels 14 in the raised position.

A hydraulic control system for lift cylinders 20 may also be similar to that as described in the previously cited application.

Couplers 18 may be of standard design, or alternatively may carry the improvements which are described in the previously cited application.

In accordance with this invention, second chassis 21 is shown to be carried by the first chassis 10 through lift cylinder means 20, specifically lift cylinders which may be hydraulically interconnected and positioned adjacent corners of the second chassis 21. First chassis 10 carries motor 16 and the transmission means for driving the vehicle rail wheels 11, occupying an aperture defined in second chassis 21.

Lift cylinders 20 are pivotally mounted to front portion 23 of first chassis 10 at pivots 34, and are also pivotally mounted to second chassis 21 at pivots 36. Accordingly, the second chassis 21 is capable of vertical motion relative to first chassis 10 by appropriate operation of interconnected lift cylinders 20.

At the same time, second chassis 21 may be adapted to be horizontally movable as well along the longitudinal axis 38 of the vehicle of this invention. Resilient stop means are provided for limiting the horizontal motion of the second chassis 21 in a shock reducing manner. Accordingly, shock encountered by the transmission means of the vehicle through couplers 18, while coupling with railroad cars and the like, may be greatly reduced.

One of the two chassis 10, 21, and specifically second chassis 21 may carry resilient buffer means embodied in a pair of rubber rollers 40 pivotally mounted to second chassis 21 by axles 42.

First chassis 10 carries a pair of upstanding plates 44 which define a pair of opposed, spaced vertical walls 46 which define an aperture between them in which rubber rollers 40 reside. The width of the aperture defined by walls 46 may be essentially equal or greater to the diameter of rollers 40 as is desired. Under either circumstance, the horizontal motion of second chassis 21 relative to first chassis 10 will be limited by the permissable degree of play of rollers 40 within the aperture defined between walls 46. Accordingly, as the vehicle advances one of couplers 18 into the coupler of a heavily loaded railroad car, a substantial shock is generated due to the inelastic collision between the couplers of the two heavy vehicles. The shock of the collision is received by second chassis 21, and is transmitted to rubber rollers 40, which will elastically impinge against a wall 46. Accordingly, the shock encountered by first chassis 10, including the engine, the transmission, and other components mounted thereon, will be very substantially reduced due to the shock-absorbing, elastic nature of rubber rollers 40.

Thus, when the railcar moving vehicle of this invention is coupling between railcars, the shock which is transmitted through either coupler 18 during railcar moving operations may be transmitted out to the adjacent railcar at the coupler 18 at the other end of second chassis 12. Hence, the shock is not transmitted directly to first chassis 10 or any of the components carried thereon including the motor and transmission. Also, the operator is protected from the effects of shock by the structure of this invention.

Lift cylinders 20 may be operated to raise couplers 18 mounted on second chassis 21 into alignment with the couplers of the car which is to be coupled. After coupling, the weight transfer operation can also take place by the operation of cylinders 20, raising the entire second chassis 21 along with couplers 18 until the desired amount of weight has been transferred from the railroad car to the vehicle of this invention, to provide adequate traction for the railroad wheels 11. Lift cylinders may be adjusted as desired during this weight transfer process to realign the connected couplers.

For retransfer of the weight of the railroad car from the vehicle of this invention back to the car, cylinders 20 may be lowered, followed by disconnection of the appropriate coupler 18 from the railroad car.

The above has been offered for illustrative purposes only, and is not intended to limit the application of this invention, which is as defined in the claims below.

That which is claimed is:

1. A railcar moving vehicle comprising, in combination, first frame means having mounted thereon a plurality of road and rail wheels, engine and drive components, and an operator's cab, second frame means having a pair of couplers mounted thereon, one adjacent each end thereof for coupling with a railcar to be moved, said second frame means being carried on said first frame means and being vertically movable relative to said first frame means, whereby upon elevating said second frame means said coupler means may be raised beneath the coupler of a railcar to be moved thereby transferring a portion of the weight of such railcar to said second frame means, and means for raising and lowering said second frame means relative to said first frame means.

2. The invention of claim 1 where said means for raising and lowering said second frame means relative to said first frame means comprises a plurality of hydraulic lift cylinders interconnecting said first and second frame means.

3. The invention of claim 2 where each of said hydraulic lift cylinders is pivotally connected at one end to said first frame means and is pivotally connected at its other end to said second frame means.

4. The invention of claim 1 including first guide means on said first frame means and second guide means on said second frame means, said first and second guide means being engageable during raising and lowering of said second frame means to guide the latter relative to said first frame means.

5. A railcar moving vehicle comprising, in combination, first frame means having mounted thereon a plurality of road and rail wheels, engine and drive components and an operator's cab, second frame means having a pair of couplers mounted thereon, one adjacent each end thereof for coupling with a railcar to be moved, said second frame means being carried on said first frame means and being longitudinally movable a limited extent relative to said first frame means, said first and second frame means being longitudinally interconnected by shock absorbing means, whereby upon application of a longitudinal shock to said coupler means said shock will be partially absorbed by said shock absorbing means before being transmitted to said first frame means.

6. The invention of claim 5 where said shock absorbing means comprises compressible means mounted on said second frame means for engagement against a fixed guide member carried on said first frame means.

7. A railcar moving vehicle comprising, in combination, first frame means having mounted thereon a plurality of road and rail wheels, engine and drive components, and an operator's cab, second frame means having a pair of couplers mounted thereon, one adjacent each end thereof for coupling with a railcar to be moved, said second frame means being carried on said first frame means and being vertically movable relative to said first frame means, whereby upon elevating said second frame means said coupler means may be raised beneath the coupler of a railcar to be moved thereby transferring a portion of the weight of such railcar to said second frame means, means for raising and lowering said second frame means relative to said first frame means, said second frame means also being longitudinally movable a limited extent relative to said first frame means, and said first and second frame means being longitudinally interconnected by shock absorbing means, whereby upon application of a longitudinal shock to said coupler means said shock will be partially absorbed by said shock absorbing means before being transmitted to said first frame means.

8. The invention of claim 7 where said means for raising and lowering said second frame means relative to said first frame means comprises a plurality of hydraulic lift cylinders interconnecting said first and second frame means, each said hydraulic lift cylinder being pivotally connected at one end to said first frame means and pivotally connected at its other end to said second frame means so that in addition to moving said second frame means vertically relative to said first frame means said lift cylinders permit limited longitudinal movement of said second frame means relative to said first frame means.

9. The invention of claim 7 where said shock absorbing means comprises compressible means mounted on one of said first and second frame means and engageable against guide means connected to the other of said first and second frame means, said compressible means being vertically movable relative to said guide means to permit vertical movement of said second frame means relative to said first frame means.

10. A railcar moving vehicle comprising, in combination, first frame means having mounted thereon a plurality of road and rail wheels, engine and drive components, and an operator's cab, second frame means having a pair of couplers mounted thereon, one adjacent each end thereof for coupling with a railcar to be moved, said second frame means being carried on said first frame means by a plurality of hydraulic lift cylinders which can move said second frame means vertically relative to said first frame means, whereby upon elevating said second frame means relative to said first frame means said coupler means may be raised beneath the coupler of a railcar to be moved thereby transferring a portion of the weight of such railcar to said second frame means, said second frame means also being longitudinally movable a limited extent relative to said first frame means, said first and second frame means being longitudinally interconnected by shock absorbing means whereby upon application of a longitudinal shock to said coupler means said shock will be partially absorbed by said shock absorbing means before being transmitted to said first frame means, and said shock absorbing means comprises compressible means mounted on one of said first and second frame means and engageable against guide means connected to the other of said first and second frame means, said compressible means being movable vertically relative to said guide means to permit vertical movement of said second frame means relative to said first frame means.

11. Each of said hydraulic lift cylinders is pivotally connected at one end to said first frame means and pivotally connected at the other end to said second frame means, and said compressible means comprises at least one compressible roller which is longitudinally engageable against said guide means for shock absorption and is also vertically movable relative to said guide means during vertical movement of said second frame means relative to said first frame means.

12. The invention as defined in claims 1, 5, 7 or 10 where said first frame means comprises front and rear frame portions interconnected by a longitudinal pivot which permits said front and rear frame portions to pivot relative to one another about a generally longitudinal axis.

* * * * *